United States Patent [19]
Demmert

[11] 3,964,730
[45] June 22, 1976

[54] SEINE-HAULING POWER BLOCKS

[76] Inventor: Lawrence E. Demmert, 1275 E. Bakerview Road, Bellingham, Wash. 98225

[22] Filed: Sept. 30, 1974

[21] Appl. No.: 510,733

Related U.S. Application Data

[63] Continuation of Ser. No. 221,933, Jan. 31, 1972, abandoned, and a continuation-in-part of Ser. No. 701, Jan. 5, 1970, Pat. No. 3,643,365, which is a continuation-in-part of Ser. No. 759,693, Sept. 13, 1968, Pat. No. 3,535,811.

[52] U.S. Cl. .................................. 254/138; 43/8
[51] Int. Cl.² ........................................ A01K 73/06
[58] Field of Search ........ 254/138, 137, 191, 175.5, 254/175.7; 43/8 R

[56] References Cited
UNITED STATES PATENTS

| | | |
|---|---|---|
| 981,918 | 1/1911 | Davidson .......................... 254/138 |
| 1,164,629 | 12/1915 | Bergman ........................... 254/137 |
| 2,810,980 | 10/1957 | Puretic .................................. 43/8 |
| 3,161,980 | 12/1964 | James ............................... 254/137 |
| 3,791,625 | 2/1974 | Viljoen ............................. 254/138 |
| 3,847,378 | 11/1974 | Roemer, Jr. ...................... 254/191 |

Primary Examiner—Robert J. Spar
Assistant Examiner—Kenneth Noland
Attorney, Agent, or Firm—Robert W. Beach

[57] ABSTRACT

A power block is mounted above the deck of a trawler for hauling in seine to be piled on the deck. Rollers mounted on the power block are engageable by a seine looped over the sheave of the power block to increase the arc of wrap of a seine draped over the block sheave for increasing the traction of the sheave on the seine.

6 Claims, 5 Drawing Figures

SEINE-HAULING POWER BLOCKS

This application is a continuation of application Ser. No. 221,933, filed Jan. 31, 1972, now abandoned for Seine-Hauling Power Block, which was a continuation-in-part of application Ser. No. 701, filed Jan. 5, 1970 for Mounting Mechanism for a Seine-Hauling Power Block, issued as U.S. Pat. No. 3,643,365, on Feb. 22, 1972 which was a continuation-in-part of application Ser. No. 759,693, filed Sept. 13, 1968, for Mounting Mechanism for a Seine-Hauling Power Block, issued as U.S. Pat. No. 3,535,811 on Oct. 27, 1970.

It is a principal object of the present invention to increase the traction between a seine and the sheave of a Puretic type power block used for hauling the seine. The Puretic-type of block is disclosed, for example, in U.S. Pat. Nos. 2,733,530; 2,733,531; 2,810,979; 2,810,980; 2,875,547; and 3,791,625.

More specifically it is an object to effect such increase in traction by guiding a seine draped over the power block sheave to wrap around such sheave through an arc greater than the arc of wrap produced by gravity.

Figure 1:
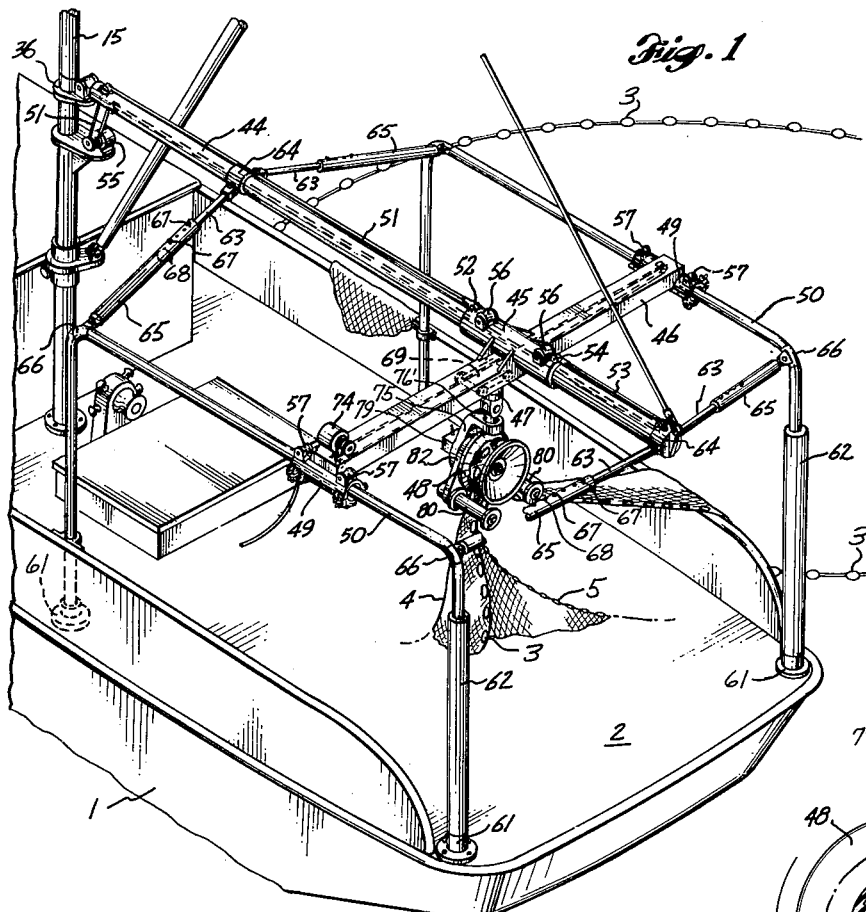
FIG. 1 is a top perspective of the aft portion of a purse seiner showing a power block installation according to the present invention.
Figure 4:
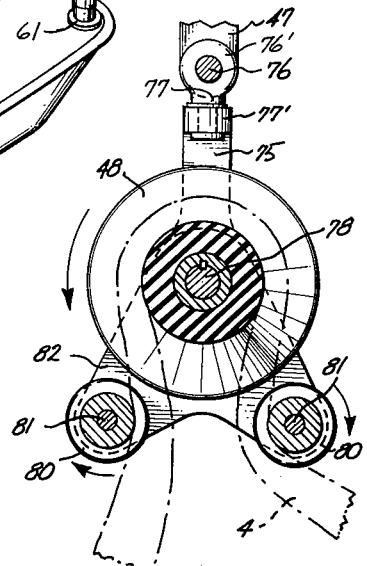
FIG. 4 is a vertical section through the block taken on line 4—4 of FIG. 3.
Figure 3:
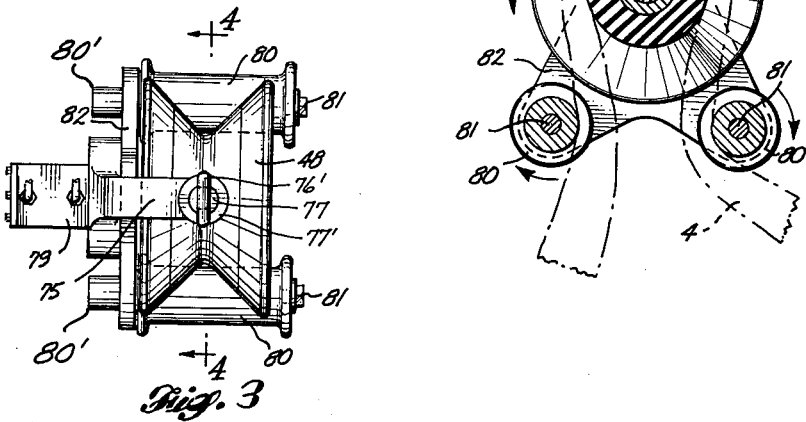
FIG. 3 is a plan of the block.

The boat 1 shown in FIG. 1 is a typical purse seiner, on the afterdeck 2 of which the purse seine is stowed. In recent years such purse seines including the corkline 3, the web 4 and the leadline 5 have been hauled by being passed over a Puretic-type power-driven block 48. Customarily such a power block has been elevated far above the boat deck, being suspended from the tip of an upwardly inclined boom which has been held stationary during at least a portion of the hauling of the seine but which is mobile in that it can be relocated easily at will. In order to stow the seine as it is hauled in, four men have been required. The first man has piled the leadline 5 on the bottom of the seine, two men have piled the web 4 of the net, which may be as wide as 120 feet, and the fourth man has piled the corkline 3 secured to the upper edge of the web.

By use of the mechanism shown in FIG. 1, the seine can be laid back and forth by moving the readily mobile block 48 bodily athwartships and fore and aft as the seine is hauled in so that only two men are required for the operation. One man slides the purse rings on a ring bar and coils the leadline 5, and the other man operates the controls to effect reeling in of the seine and the athwartship movement and the fore and aft movement of the block for piling the seine. The seine is laid on the deck in folds by shifting the power block as the seine is hauled in. Thus the power block will be moved bodily progressively over locations where it is desired to have the seine piled. For this purpose the power block is supported on traveling mounting means which are located relatively close to the deck of the purse seiner and substantially in a horizontal plane, but still elevated well above the boat deck as shown in FIG. 1.

The forward end of the horizontal boom 44 is supported on a collar 36 slidable elevationally along the mast 15. The carriage 45 movable along such boom carries a straight track 46, the length of which extends athwartships of the boat 1. A swivel mounting 47 supported from such track by a trolley constitutes the mounting for the power-driven seine-hauling block 48. The outboard ends of the athwartships track 46 carry sleeves 49, each of which embraces a guiding and supporting rail 50 mounted on fore and aft posts at a side of the boat.

The carriage 45 with the athwartships track 46 can be shifted fore and aft along the boom 44 by an endless line including a forward portion 51 having its end 52 connected to the forward portion of the carriage 45 and an aft portion 53 having its end 54 connected to the aft portion of the carriage. An intermediate portion of the line 51,53 is wound around the drum of a small winch motor 55, which can be either hydraulic or electric. Rotation of the motor in one direction will reel in the forward line portion 51 and pay out the aft line portion 53 correspondingly to shift the carraige 45 forward. Alternatively, the motor 55 can be driven in the reverse direction to haul in the aft line portion 53 and correspondingly pay out the forward line portion 51 to shift the carriage 45 rearwardly.

The carriage 45 is supported for movement fore and aft along the boom 44 by rollers 56 journaled in the upper portion of the carriage fore and aft of the athwartships track 46, respectively. The outboard sleeves 49 have corresponding rollers 57 journaled in their upper portions fore and aft of the athwartships track 46 for the purpose of supporting such sleeves on one or the other of the side rails 50.

The lower ends of the guide rails 50 can be anchored to the deck of the boat 1 by flanged deck plates 61 connected to the lower ends of the U-shaped guide rail. In order to avoid chafing of the seine by being drawn across the aft leg of a guide rail 50, such leg may be fitted loosely within a tube 62 rotatable relative to such leg to constitute a roller. The junctions of the upright legs with the horizontal stretches of the guide rails 50 can be braced relative to the boom 44 by struts variable in effective length. Each strut may be of telescoping construction including an inner section 63 having one end detachably connected to a collar 64 secured to the boom 44 and having its opposite end received within an outer tubular portion 65. The outboard end of each outer section is detachably connected to a collar 66 embracing the guide rail 50 and the opposite end of such outer section is connected to the end of the inner strut section 63 by one or more pins 67 extending through one or more of the apertures 68 in the overlapping strut ends. Thus one end of a strut can be disconnected or the entire strut can be removed.

The swivel mounting 47 on which the block 48 is mounted is suspended from a trolley 69 received in the channel-shaped track 46. Such trolley can be moved along the track by a line loop wound around the drum of a small winch 74 which can be driven either by a hydraulic motor or an electric motor.

As shown in all figures of the drawings, the power block 48 has only a sole peripherally grooved sheave, which is mounted on a hanger 75 supported for swinging relative to the swivel mounting 47 by a pivot pin 76 extending through the eye 76'. Such eye carries a shank 77 upon which a collar 77' of the hanger 75 is swiveled. Consequently, the power block can swing athwartships and can be swiveled freely while it is hauling in the seine draped over it, as well as being bodily shiftable because the mobile mounting of hanger 75 on swivel mounting 47 carried by trolley 69.

The sole, peripherally-grooved power block sheave is mounted on a shaft 78 turned by a motor 79 to haul the seine. The seine draped over the sheave in the sheave groove is kept wrapped around the core of the power block sheave through an arc greater than the arc of wrap produced by the effect of gravity on the seine by passing the seine between opposite guide rollers 80 carried by cantilever shafts 81, each of which has one end secured in a plate 82 which is swingably mounted on the supporting shaft 78 for the sheave. To effect such increased arc of wrap, a guide roller has a maximum diameter much smaller than the maximum diameter of the block sheave, is mounted by a cantilever shaft on the hanger lower than the axis of the sheave and is closer to the sheave than the greatest radial depth of the peripheral sheave groove but spaced from the lower periphery of the sheave. Because the guide rollers 80 cause the seine to hug the groove of the block sheave throughout an arc greater than that effected by gravity, the traction of the block sheave on the seine for hauling it is increased correspondingly.

The guide rollers 80 may be idler rollers, and are journaled on the cantilever shafts 81. Alternatively, such rollers can be powered by being secured to the cantilever shafts and driving those shafts by hydraulic motors 80' or by gearing the shafts 81 to the power block shaft 78. The guide rollers 80 should always rotate in the direction opposite the rotative direction of the sole power block sheave. If the shafts 81 are driven independently of the shaft 78 by hydraulic motors 80' and the motor 79 driving the sheave 48 is reversible, the motors 80° should also be reversible.

By operation of the winch 74, the trolley 69 can be shifted athwartships back and forth along the track 46 as the seine is being hauled in. Periodically the carriage 45 supporting the track 46 from the boom 44 can be shifted forward or rearward along such boom by operation of the winch 55. By such combination of athwartships movement of the trolley 69 and longitudinal shifting of track 46, the seine can be laid in neat convolutions on the deck of the purse seiner by one man with comparatively little effort, instead of such stowing of the seine requiring hard work of several men.

Figure 5:
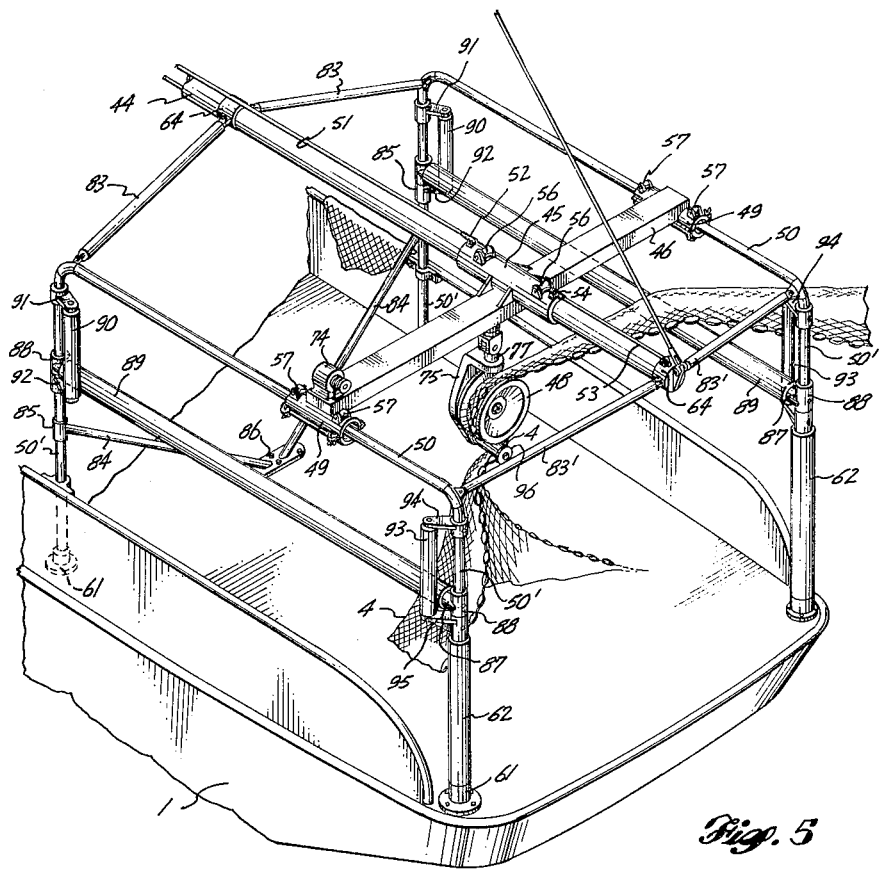
FIG. 5 is a top perspective of the aft portion of a purse seiner generally similar to the illustration of FIG. 1, but showing a different type of seine-guiding roller mechanism.
Figure 2:
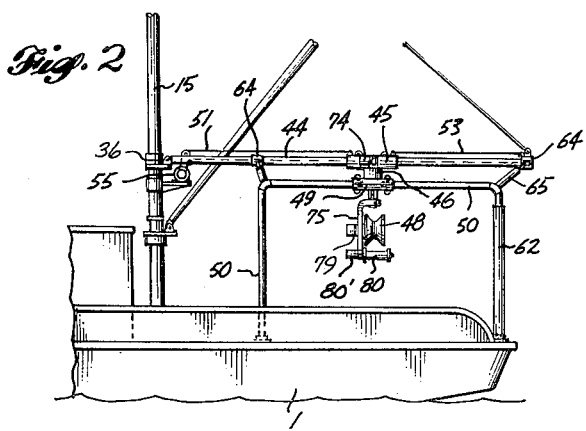
FIG. 2 is a side elevation of such power block installation.

In FIG. 5 the installation of the seine-hauling power block described is modified by bracing the boom 44, elevated well above the boat deck, more effectively and providing an arrangement of guide rollers to support the seine for facilitating the hauling operation. Struts 83 connect opposite sides of collar 64 on the boom 44 to the forward ends of side rails 50. Diagonal struts 84 extend between collars 85 on the forward posts 50' supporting the side rails 50 and a deck plate 86. Such struts 83 and 84 cooperate to support the posts 50', the forward ends of the side rails 50 and the boom 44 quite rigidly.

The aft ends of the side rails 50 are connected to an aft collar 64 by oppositely directed struts 83'. The opposite ends of such struts also should be detachably connected to their collars. In addition, the forward and aft posts 50' are connected at a location a substantial distance below the side rails 50 by horizontal struts 87 which are attached to the posts by collars 88 forming T-fittings with the respective ends of the struts 84. Such struts extend through tubes 89 mounted loosely on them to function as rollers for supporting the seine 4 passing over such a roller and beneath the guide rail 50 above it.

As has been explained previously, the aft railsupporting posts 50' extend through rollers 62 which may be engaged by a seine to reduce resistance to movement of the seine past such posts. It is desirable to have guide rollers serving the same purpose located in registration with the upper portions of the posts 50'. Rollers 90 rotatable about upright axes are shown supported by upper brackets 91 and lower brackets 92 attached to the upper portions of the forward posts 50'. Such rollers 90 extend lengthwise from locations below the horizontal rollers 89 to locations a substantial distance above such horizontal rollers to be engaged by a seine sliding forward along a horizontal roller 89.

Correspondingly, rollers 93 are supported for rotation about upright axes by upper brackets 94 and lower brackets 95 attached to the aft rail-supporting post 50'. Again, these rollers extend from locations below the horizontal rollers 89 to locations a substantial distance above such rollers. A roller 93 might therefore by contacted by a seine being hauled in over the aft portion of the corresponding horizontal roller 89.

The power block 48 of the installation shown in FIG. 5 has a single guide roller 96 arranged symmetrically about a vertical plane beneath the sole power block sheave, which may be engaged by the seine. The guide roller is located closer to the sheave than the depth of the sheave groove. As shown in this figure, the seine being hauled in is draped into the upper portion of the block sheave groove and then down in the downwardly-moving portion of the sheave groove to a location beneath the sheave, the outrunning portion of the seine moving between the sheave and the guide roller 96 and passing around such guide roller before it is piled on the deck, so that the seine will extend around an arc of at least 180° of the block sheave groove. By insuring an arcuate contact of this extent between the seine and the block sheave groove, the traction between the sheave and the seine is greatly increased and slippage of the sheave relative to the seine is decreased correspondingly.

The guide roller 96, like the guide rollers 80 described above, can be an idler roller mounted rotatively on its cantilever shaft. Alternatively, this roller like the guide roller 80, also can be powered to rotate in the direction opposite the direction of rotation of the block 48, either by being connected by gearing to the power block sole sheave or by being rotatable by a hydraulic motor connected to drive the shaft on which the guide roller 96 is mounted and to which it is rotatively secured.

Because the extent of arcuate contact between the seine and the sole sheave of the power block is greater than would be produced by the effect of gravity on the seine, which is assured by passing the outrunning portion of the seine between such sole sheave and the guide roller 96, the seine can be pulled in by leading it between a roller 89 and the guide rail 50 above it as shown in FIG. 5. The power block can then be shifted athwartships along the track 46 while such track is shifted progressively forward or rearward along the boom 44 as described previously. The seine will pass over the roller 89 progressively from one end to the other as the seine is piled on the boat deck.

I claim:

1. A seine-hauling power block for a fishing boat, comprising a Puretic-type sole seine-hauling sheave having a peripheral groove, mobile hanger means suspending said sheave in an elevated position, power means for rotating said sheave in a predetermined direction to haul in a seine wrapped in said sheave peripheral groove, two guide rollers each having a maximum diameter much smaller than the maximum diameter of said sheave, two cantilever shafts on said hanger means lower than the axis of said sheave and mounting said guide rollers, respectively, closer to said sheave than the greatest radial depth of said peripheral sheave groove but spaced from the lower periphery of said sheave, said rollers being spaced from each other circumferentially of said sheave for engaging said guide roller with the side of the seine opposite that engaged with the sheave groove and for effecting wrapping of the seine in the sheave groove around an arc greater than the arc of wrap produced by the effect of gravity on the seine, and power means for driving at least one of said guide rollers to rotate in the direction opposite the direction of rotation of said sheave.

2. The power block defined in claim 1, in which the spacing between the guide rollers circumferentially of the sheave is substantially equal to the minimum diameter of the sheave.

3. The power block defined in claim 1, the power means effecting conjoint rotation of both guide rollers in the same direction.

4. A seine-hauling power block for a fishing boat, comprising a Puretic-type sole seine-hauling sheave having a peripheral groove, mobile hanger means suspending said sheave in an elevated position, power means for rotating said sheave to haul in a seine draped in said sheave peripheral groove, a guide roller having a maximum diameter much smaller than the maximum diameter of said sheave, a cantilever shaft on said hanger means lower than the axis of said sheave and mounting said guide roller closer to said sheave than the greatest radial depth of said peripheral sheave groove but spaced from the lower periphery of said sheave for engaging said guide roller with the side of the seine opposite that engaged with the sheave groove and for effecting wrapping of the seine in the sheave groove around an arc greater than the arc of wrap produced by the effect of gravity on the seine, and power means for driving said guide roller to rotate in the direction opposite the direction of rotation of said sheave.

5. Seining gear comprising a power block including a sole seine-hauling sheave having a peripheral groove, mobile hanger means suspending said sheave in an elevated position, power means for rotating said sheave in a predetermined direction, a seine draped in the peripheral groove of said sheave and movable lengthwise by rotation of said sheave, a guide roller having a maximum diameter much smaller than the maximum diameter of said sheave, a cantilever shaft on said hanger means lower than the axis of said sheave and mounting said guide roller closer to said sheave than the depth of said peripheral sheave groove but spaced from the lower periphery of said sheave the portion of said seine running off said sheave passing between said sheave and said guide roller and being engaged with said guide roller for effecting wrapping of said seine in the sheave groove around an arc greater than the arc of wrap produced by the effect of gravity on said seine, and power means for rotating said guide roller in the direction opposite the direction of rotation of said sheave.

6. The method of hauling a seine by the use of an elevated Puretic-type power block having a sole power-rotated, peripherally-grooved, seine-hauling sheave, which comprises power-rotating the sheave, draping the seine in the upper portion and the downwardlymoving portion of the power-rotated sheave groove, wrapping the seine in the downwardlymoving portion of the power-rotated sheave groove around an arc greater than the arc of wrap produced by the effect of gravity on the seine by passing the downwardly-moving portion of the seine between such sheave and a guide roller having its axis lower than the axis of the power-rotated sheave and the roller being located closer to the power-rotated sheave than the depth of the sheave groove, and power-rotating such guide roller to rotate in the direction opposite to the direction of rotation of the power-rotated sheave.

* * * * *

PO-1050
(5/69)

UNITED STATES PATENT OFFICE
CERTIFICATE OF CORRECTION

Patent No. 3,964,730                 Dated June 22, 1976

Inventor(s) Lawrence E. Demmert

It is certified that error appears in the above-identified patent and that said Letters Patent are hereby corrected as shown below:

Column 6, line 18, insert a comma after "periphery of said sheave"; lines 31 and 32, cancel "downwardlymoving" and insert ...downwardly-moving...; line 33, cancel "downwardlymoving" and insert ...downwardly-moving...

Signed and Sealed this

Eleventh Day of January 1977

[SEAL]

*Attest:*

RUTH C. MASON
*Attesting Officer*

C. MARSHALL DANN
*Commissioner of Patents and Trademarks*